(12) United States Patent
Trumbull et al.

(10) Patent No.: US 9,244,914 B2
(45) Date of Patent: Jan. 26, 2016

(54) SCHEMA VERSIONING FOR CLOUD HOSTED DATABASES

(71) Applicant: Apple Inc., Cupertino, CA (US)

(72) Inventors: Benjamin C. Trumbull, San Jose, CA (US); Nicholas W. Gillett, Cupertino, CA (US); Adam C. Swift, San Jose, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 13/631,750

(22) Filed: Sep. 28, 2012

(65) Prior Publication Data

US 2014/0095432 A1    Apr. 3, 2014

(51) Int. Cl.
  *G06F 7/00*    (2006.01)
  *G06F 17/30*    (2006.01)
(52) U.S. Cl.
  CPC .......... *G06F 17/30* (2013.01); *G06F 17/30309* (2013.01)
(58) Field of Classification Search
  CPC .................................. G06F 17/30309
  USPC ....................................... 707/638
  See application file for complete search history.

(56) References Cited

U.S. PATENT DOCUMENTS

| | | |
|---|---|---|
| 7,302,446 B1 | 11/2007 | Boothby |
| 7,509,350 B2 | 3/2009 | Linkert et al. |
| 7,739,680 B1 * | 6/2010 | Thakur et al. ................. 717/172 |
| 7,818,740 B2 | 10/2010 | Bankston et al. |
| 8,103,704 B2 | 1/2012 | Abrams |
| 8,250,119 B2 | 8/2012 | Zazrivec et al. |
| 2011/0145210 A1 * | 6/2011 | Rathinam et al. ............. 707/705 |
| 2011/0208695 A1 | 8/2011 | Anand et al. |

* cited by examiner

*Primary Examiner* — Ajith Jacob
(74) *Attorney, Agent, or Firm* — Downey Brand LLP

(57) ABSTRACT

Methods and apparatus are provided in which applications that run on different devices can be upgraded with migration of data to a new database format. A method of upgrading a first version of an application installed on a first device to a second version is provided, where first and second transaction logs for respective first and second schema versions are stored in respective first and second log containers on a server computer, and the first version of the application stores data in accordance with a first schema version, and further stores a cache of at least a portion of the first transaction log in a log database on the first device, migrating the log database to the second schema version, storing a duplicate copy of the first transaction log in the second log container, and rewriting the duplicate copy of the first transaction logs using the second schema.

20 Claims, 6 Drawing Sheets

402

Transaction Log

404

| Inserted | Table=Person |
|---|---|
| Key | Value |
| firstName | "John" |
| lastName | "Doe" |
| Schema | "homeAddress" |
|  |  |

406

| Updated | Table=Person |
|---|---|
| Key | Value |
| Schema emailAddress | "email" |
| lastName | "Doe" |
|  |  |
|  |  |

408

| Deleted | Table=Person |
|---|---|
| Key | Value |
| firstName | "Sam" |

FIG. 4

SCHEMA VERSIONING FOR CLOUD HOSTED DATABASES

TECHNICAL FIELD

The present invention relates generally to data storage in computer systems. More particularly, the present embodiments relate to synchronization of data across multiple devices.

BACKGROUND

As cloud computing and portable computing devices have grown in popularity and capability, there has been a proliferation of applications storing data on network servers, with users accessing the data via multiple different versions of applications that may use and expect different formats for the data. Users expect their existing applications to continue to work, while being able to upgrade the applications to add new features, which may involve changing the structure of the data that is stored.

Applications that store data can use schemas to define the structure of the data. When an application is upgraded to a new version, the schema may change to accommodate application features. To allow the upgraded application to continue to use existing data created with the previous version, existing data that conforms to one schema can be migrated to an updated version of the schema. In cloud computing, a user may have several devices, such as a desktop computer and a mobile device, that are used to access data stored on a server. The cloud computing environment provides for sharing data among multiple devices, so that separate copies of the data need not be maintained on each device. An application such as a word processor can run on each device, and changes to data stored in the cloud made on one device appear automatically on the other devices, so users need not be concerned with copying and merging changes to data made on different devices.

SUMMARY

The present application describes various embodiments regarding systems and methods for enabling different versions of applications that run on different devices to use and share cloud-based data created with different schema versions. Computer programs, referred to herein as applications, can be run on multiple different devices, e.g., personal computers, mobile phones, tablets, and so on. An application can be installed on multiple devices used by the same user, e.g., on a mobile phone, a desktop computer, a tablet, or the like. Applications often have associated data, e.g., documents created by a word processor application. This application data can be stored on one or more servers, which maintain a shared database of application data accessible from multiple devices. Storage of a database on one or more servers in this way is referred to as cloud-based storage, or storage in the cloud. Cloud-based storage of application data enables a user to access a single instance of the data from different devices.

A user can upgrade an application installed on different devices at different times, thereby creating a "version skew" between applications of on different devices. Techniques are described herein to preserve changes made at device during the time that the device has a different schema version the user's other device(s). In one aspect, when an application installed on a particular device is upgraded to a newer version that uses a new schema version with a different format (e.g., different data fields), any changes to the data that were present in the previous version but not in newer version are merged into the newer version, and vice-versa, and all of the changes up to the present time are shared among all of the user's devices that access the newer version in the cloud. The database upgrade techniques described herein thus provide a solution to handle version skew between the applications on different devices so that the user does not lose changes made on devices that have different versions because they upgrade different devices at different times.

When a situation with multiple simultaneously existing schemas occurs, the schemas and databases of the two different versions can be merged by creating a separate database for the new version of the schema, to be used by an upgraded version of the application. Since the device on which the upgraded application is installed no longer shares the same database instance as the devices with the older version, there is a version skew problem, in which changes to the data on one device are not automatically reflected on the other device. For example, changes made to a document on a mobile phone that uses the latest version are not reflected in a previous version of the application that runs on a tablet. Similarly, changes made on the tablet are stored in the database associated with the previous version, and are not reflected in the newer version of the database used by the mobile phone. This problem can be addressed by merging the different versions of the databases when the application is upgraded to the latest version on one or more of the user's devices, as described herein.

The merging can be done using a mapping to translate the information from the older format to the newer format. The transaction logs that represent the information are migrated to the newer format. The migrated transaction logs are then replayed, using a timeline of when the changes occurred that is embedded in the transaction logs, to merge the historical information, and to bring both versions into sync. The order in which the changes occurred is preserved in this merging process. Thus the transaction activity that occurred during the existence of the two separate versions is merged, instead of just merging the end results of the activity. Any changes to the data that were present in the previous version but not in newer version are thus merged into the newer version, and vice-versa, and the changes up to the present time are shared among all of the user's devices that access the newer version in the cloud.

In one embodiment, a method of upgrading a first version of an application installed on a first device to a second version is described. The method includes receiving a request to update a first version of an application installed on a first device to a second version, where first and second transaction logs for respective first and second schema versions are stored in respective first and second log containers on a server computer, and the first version of the application stores data in accordance with a first schema version, and further stores a cache of at least a portion of the first transaction log in a log database on the first device, migrating the log database to the second schema version, storing a duplicate copy of the first transaction log in the second log container, and rewriting the duplicate copy of the first transaction logs using the second schema.

Embodiments may include one or more of the following features. Rewriting may include applying changes specified in the second transaction logs to each transaction in the duplicate copy of the first transaction logs in the order that the transactions appear in the second transaction logs. The second transaction logs may have previously been upgraded from the first schema version to the second schema version, and method may also include changing a field of the first schema to a modified field prior to receiving the request to upgrade, where rewriting the duplicate copy comprises changing a second field of the second schema to the modified field, the second field corresponding to the first field. The method may also include identifying the second field of the second schema in accordance with a schema mapping that maps elements of the first schema to corresponding elements of the second schema. The second transaction logs may have previously been upgraded from the first schema version to the second schema version, and the method may also include setting a first field of the first schema to a modified data value prior to receiving the request to upgrade, and where rewriting the duplicate copy comprises setting a second field of the second schema to the modified data value, the second field corresponding to the first field. The method may also include deleting the first transaction logs in response to detecting that the first transaction logs are not referenced by any peer devices.

In another embodiment, a non-transitory computer readable medium for a computer system is provided. The computer readable medium has stored thereon computer program code executable by a processor, and the computer program code includes code that causes the processor to maintain first and second databases having respective first and second versions and using respective first and second schemas, where first and second versions of an application are installed on first and second devices, respectively, the first and second versions of the application storing data in the respective first and second databases, and where the first version of the application synchronizes with the first database, and the second version of the application synchronizes with the second database. The code also causes the processor to receive a request to upgrade the first database to the second schema, create a database file that uses the second schema, migrate data from the first database to the database file, and synchronize the database file with the second database.

Embodiments can include one or more of the following features. Migrating the data may include mapping elements of the first schema to elements of the second schema in accordance with a predefined upgrade schema mapping, and storing the data from the first database in the database file in accordance with the mapping and in conformance with the second schema. The request to upgrade the first database may be in response to a request to upgrade the first version of the application to the second version of the application. The first schema may differs from the second schema by at least one field name or field type. The first and second databases may include respective first and second transaction logs, the transaction logs may include entries that indicate changes to the respective databases, and the first and second transaction logs may be stored in respective first and second log containers on the server computer.

The computer readable medium can further include code that causes the processor to delete the first database when the first database is no longer referenced by any applications installed on the first or second devices. The computer program code that causes the processor to synchronize the database file with the second database may include computer program code that causes the processor to apply changes specified in the first transaction logs to each transaction in the second transaction logs in the order that the transactions appear in the first transaction logs. Creating the database file may comprise creating a local database file stored on a local storage medium of the first device. Synchronizing the database file with the second database can include copying data items that are present in the database file but not the second database to the second database, and copying data items that are present in the second database but not the database file to the database file. Synchronizing the database file with the second database can include merging items that are present in both the database file and the second database to form merged items, and storing the merged items in both the database file and the second database.

In another embodiment, a system configured to upgrade a database schema of an application is described. The system includes a processor configured to receive a request to upgrade a first database instance associated with the application from a current version of the schema to an other version of the schema, where a second database instance conforming to the other version of the schema and associated with a second device has previously been upgraded from the current version to the other version. The processor is also configured to change at least one element of the current schema to produce a modified schema element in the current schema, create a temporary database that conforms to the other version of the schema, migrate schema modifications from the first database instance to the temporary database, and synchronize the temporary database with the second database to store the data from the first database in the second database, where the migrating comprises changing the at least one element in the other schema to produce the modified schema element in the other schema.

Embodiments may include one or more of the following features. The processor may be configured to change at least one element of the current schema is in response to a user request. To migrate schema modifications, the processor may be configured to copy at least one transaction log entry from the first database instance to the temporary database. Distinct versions of the schema may differ by at least one schema element name or data type. To synchronize the temporary database with the second database, the processor may be configured to apply changes specified in first transaction logs of the temporary database to each transaction in second transaction logs of the second database instance in the order that the transactions appear in the first transaction logs.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which:

FIG. 4 is an illustrative drawing of a transaction log in accordance with one or more embodiments.

DETAILED DESCRIPTION

Figure 1:
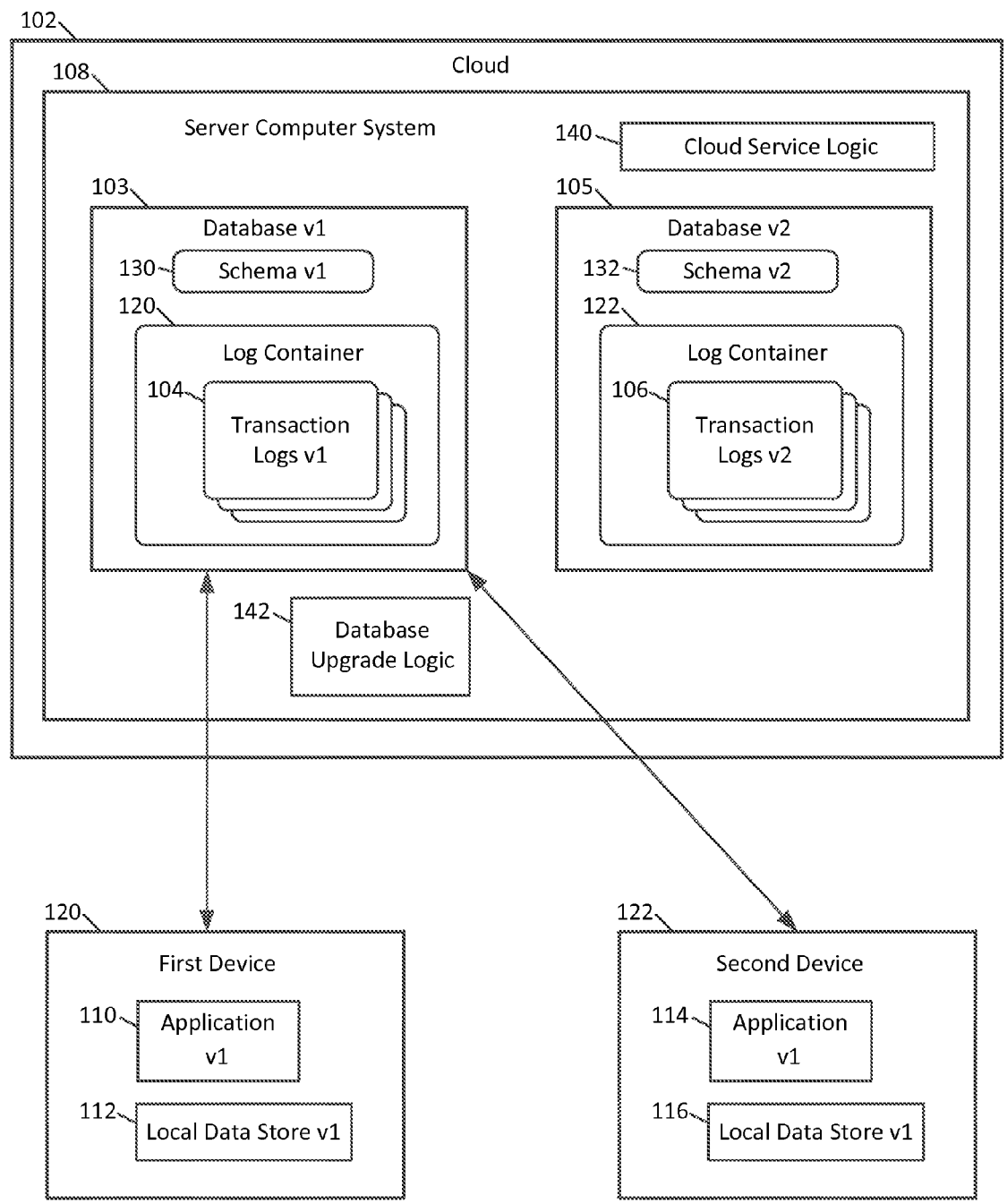
FIG. 1 is a representative drawing of a distributed schema migration system in accordance with embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

The present application describes various embodiments regarding systems and methods for enabling different versions of applications that run on different devices to use and share cloud-based data created with different schema versions. Computer programs, referred to herein as applications, can be run on multiple different devices, e.g., personal computers, mobile phones, tablets, and so on. An application can be installed on multiple devices used by the same user, e.g., on a mobile phone, a desktop computer, a tablet, or the like. Applications often have associated data, e.g., documents created by a word processor application. This application data can be stored on one or more servers, which maintain a shared database of application data accessible from multiple devices. Storage of a database on one or more servers in this way is referred to as cloud-based storage, or storage in the cloud. Cloud-based storage of application data enables a user to access a single instance of the data from different devices.

A user can upgrade an application installed on different devices at different times, thereby creating a "version skew" between applications of on different devices. Techniques are described herein to preserve changes made at device during the time that the device has a different schema version the user's other device(s). In one aspect, when an application installed on a particular device is upgraded to a newer version that uses a new schema version with a different format (e.g., different data fields), any changes to the data that were present in the previous version but not in newer version are merged into the newer version, and vice-versa, and all of the changes up to the present time are shared among all of the user's devices that access the newer version in the cloud. The database upgrade techniques described herein thus provide a solution to handle version skew between the applications on different devices so that the user does not lose changes made on devices that have different versions because they upgrade different devices at different times.

When a situation with multiple simultaneously existing schemas occurs, the schemas and databases of the two different versions can be merged by creating a separate database for the new version of the schema, to be used by an upgraded version of the application. Since the device on which the upgraded application is installed no longer shares the same database instance as the devices with the older version, there is a version skew problem, in which changes to the data on one device are not automatically reflected on the other device. For example, changes made to a document on a mobile phone that uses the latest version are not reflected in a previous version of the application that runs on a tablet. Similarly, changes made on the tablet are stored in the database associated with the previous version, and are not reflected in the newer version of the database used by the mobile phone. This problem can be addressed by merging the different versions of the databases when the application is upgraded to the latest version on one or more of the user's devices, as described herein.

The merging can be done using a mapping to translate the information from the older format to the newer format. The transaction logs that represent the information are migrated to the newer format. The migrated transaction logs are then replayed, using a timeline of when the changes occurred that is embedded in the transaction logs, to merge the historical information, and to bring both versions into sync. The order in which the changes occurred is preserved in this merging process. Thus the transaction activity that occurred during the existence of the two separate versions is merged, instead of just merging the end results of the activity. Any changes to the data that were present in the previous version but not in newer version are thus merged into the newer version, and vice-versa, and the changes up to the present time are shared among all of the user's devices that access the newer version in the cloud.

FIG. 1 is a drawing of a representative distributed schema migration system in accordance with embodiments. The distributed schema migration system includes multiple database versions 103, 105 accessible by applications 110, 114 on devices 120, 122 in a cloud-based environment. The Applications 110, 114 can be different versions of the same application or different applications, and are ordinarily associated with the same user. Each application 110, 114 executes on a corresponding device 120, 122. The devices 120 can be, for example, mobile phones, tablets, desktop computers, or the like. The applications 110, 114 can be two different versions of the same application, or both applications 110, 114 can be of the same version. Although the description herein refers to the applications 110, 114 as different versions of the same application that use different versions 130, 132 of a schema, the techniques described herein also apply to different applications that use the different versions 130, 132 of the same schema. In other embodiments, the schemas 130, 132 can be different schemas that are not versions of the same schema.

The applications 110, 114 store application data, e.g., documents, configuration, state, and the like, in databases 103, 105 located, i.e., stored, on one or more cloud-based servers 108, such as servers in the iCloud™ service provided by Apple Inc. of Cupertino, Calif. The servers use cloud service logic 104, e.g., server software that processes requests from devices for cloud services such as storing and retrieving data and documents. To store and access data in the cloud, the applications 110, 114 send and receive data from the server computer(s) 108 via a communication network, such as the Internet. In one example, the applications 110, 114 are associated with the same iCloud account, as are the devices 120, 122, which are referred to as "peer" devices because of their association with the same account. In one or more embodiments, the different databases 103, 105 remain associated with a common cloud user account. Other applications can be associated with different cloud user accounts, but a single cloud user account is used in the description herein for simplicity of explanation.

The applications 110, 114 store data in corresponding respective databases 103, 105. The term "store" refers to storing the data, e.g., on a persistent storage medium associated with the server 108. The applications 110, 114 can retrieve the stored data. Further, since multiple devices can modify data stored in the databases 103, 105, the applications are informed of any changes made to the data on other devices, and receive recent updates made on other devices. Since communication between the applications 110, 114 and the server(s) 108 is via a network connection, there can be some latency or delays in reading and writing data to and from the servers(s) 108. The applications 110, 114 can cache portions of the data on the local devices 120, 122 to improve performance, e.g., by storing recently or frequently used portions of data in local persistent stores 112, 116, which can be accessed more quickly than the databases 103, 105. In one embodiment, the local data stores 112, 116 store caches, e.g., local copies, of portions of the stored data on storage media of the respective devices 120, 222. In one or more embodiments, the applications 110, 114 are synchronized with the databases 103, 105 in which the applications store their associated data. That is, the applications 110, 114 maintain up-to-date local information about the state and contents of the database. If the applications 110, 114 are all of same version, they are synchronized with a common database 103.

Since the applications 110, 114 installed on the different devices 120, 122 can be upgraded independently, the applications 110, 114 can be of different versions. Each version of an application can use a different version of a schema. Since a single database does not ordinarily conform to two different schemas, two (or more) different application versions 110, 114 using different schema versions 130, 132 are synchronized with different databases 103, 105 that correspond to the different schemas. Thus, the data stored by each version of the application is segregated from data stored by other versions of the application. Once two different versions of the application begin using different databases, the single shared database provided by the cloud computing environment is divided into two different databases, and changes to application data made in one version of the application do not automatically appear in the other version.

Database upgrade logic 142 enables the two different applications 110, 114 that use two different databases to preserve the logical changes that they separately make to their corresponding databases 103, 105, so that the changes can later be merged back into a single database when the two applications subsequently have the same version, e.g., as a result of upgrading one or both of the applications 110, 114.

Figure 2:
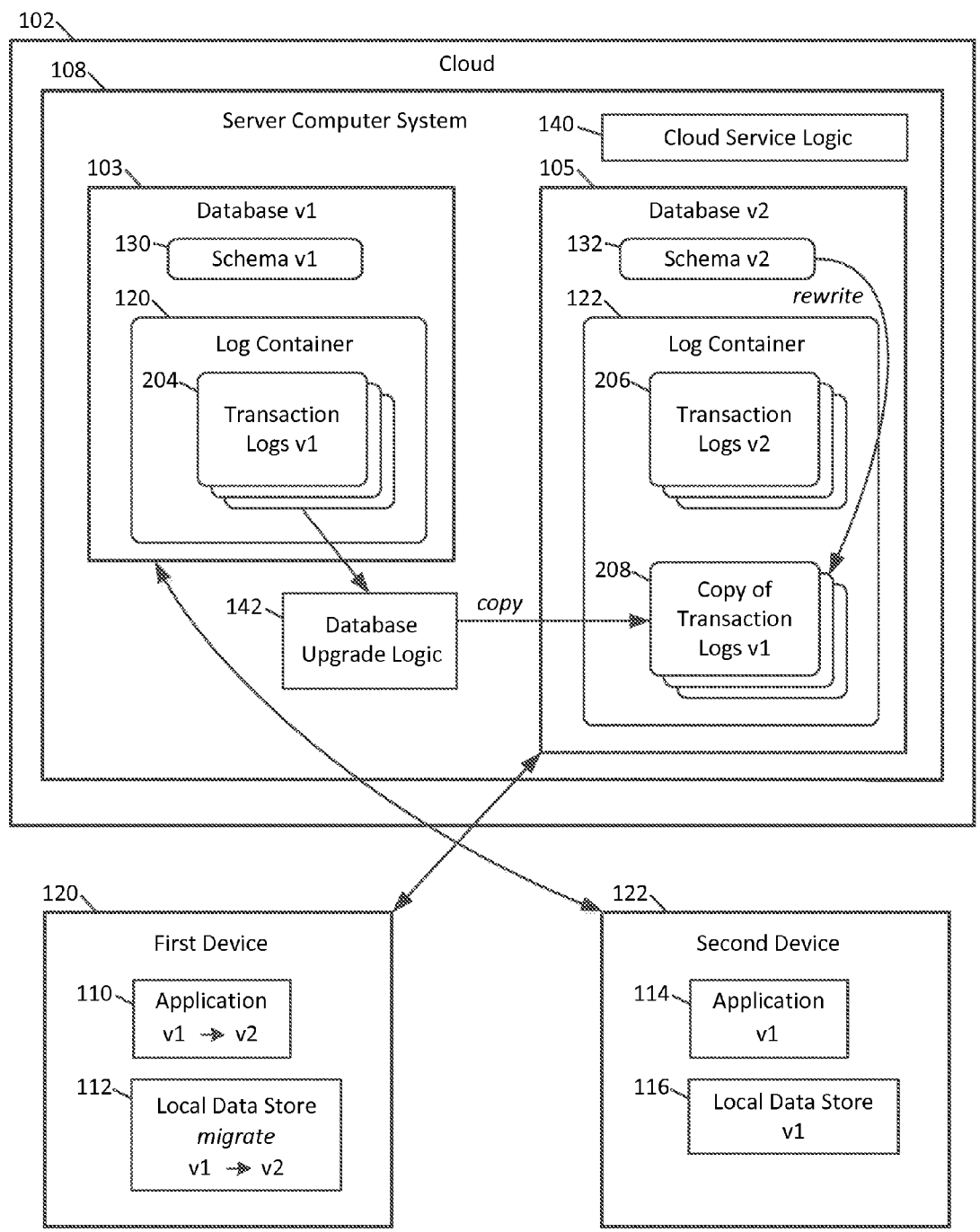
FIG. 2 is a representative drawing showing upgrading of a cloud-based database used by an application from an existing version to a new version with incorporation of data from the existing version into the new version in accordance with one or more embodiments.
Figure 3:
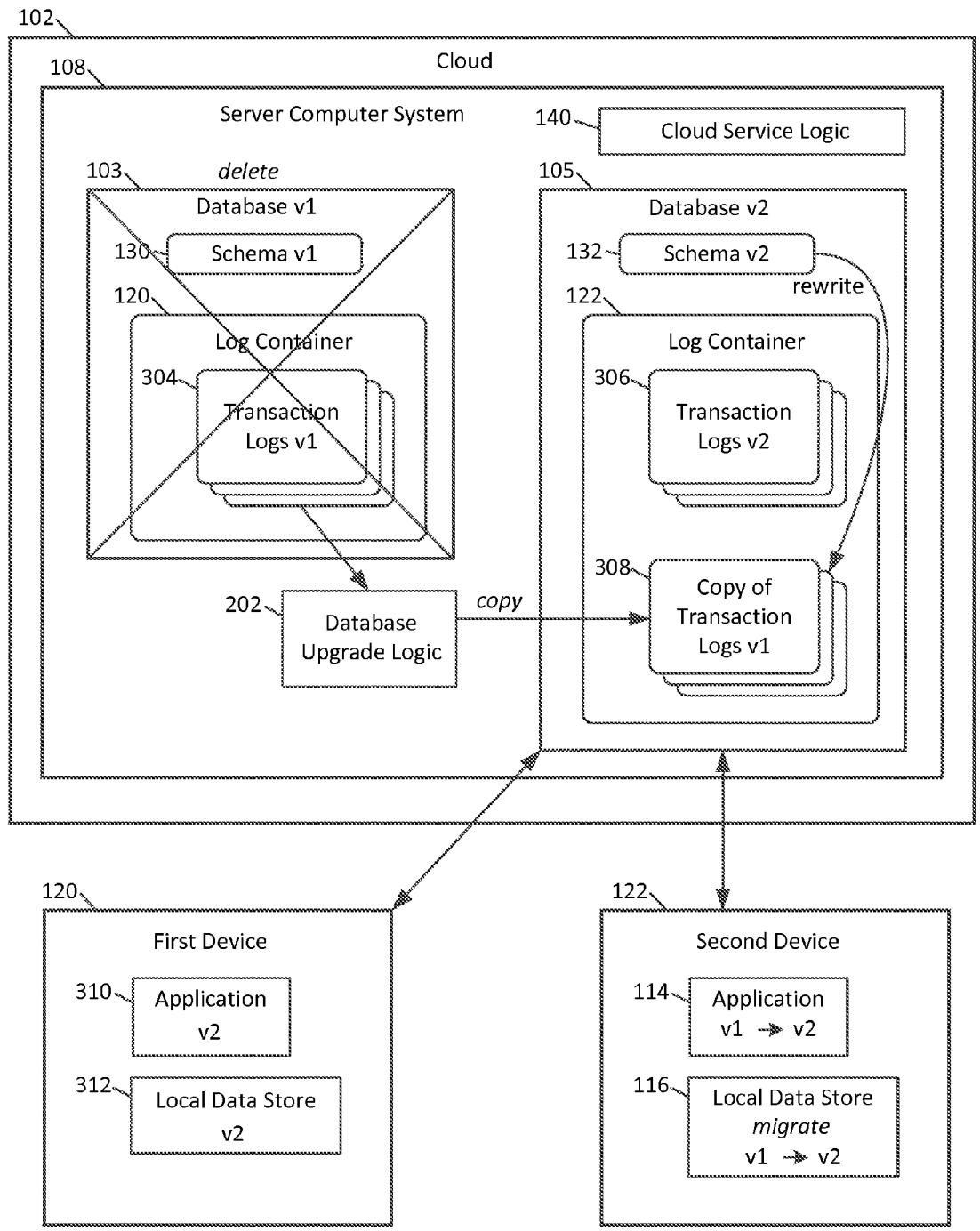
FIG. 3 is a representative drawing showing upgrading of a cloud-based database from an existing version to a new version with incorporation of data from the existing version into the new version in accordance with one or more embodiments.

In one or more embodiments, each application 110, 114 is synchronized with a database 103 that corresponds to the application's version. For example, if a first application 110 is at version 1 (v1), and a second application 114 is at version 1 (v1), then the two applications synchronize with the same database 103, which uses schema version 1 130. In another example, if the application 110 on the first device is upgraded to use a second schema version 132, then the application 110 on the first device synchronizes with the second schema version 132 instead of the first schema version 130, as shown in FIG. 2. The application 114 on the second device continues to synchronize with the first schema version 130 as long as the application 114 is not upgraded to use the second schema version 132. When the application 114 is upgraded to use the second schema version 132, then the application 114 synchronizes with the second database 105 instead of the first database 102, as shown in FIG. 3. If no other applications use the first schema version 130, then the first database 103 can be deleted.

As introduced above, in one or more embodiments, the application data stored in the cloud can be stored on one or more servers 108 in the form of database instances 103, 105 that include transaction logs 104, 106, which log individual changes made to the databases 103, 105. The transaction logs 104, 106 can be, for example, documents or flat files that contain histories of the operations performed on the databases 103, 105 by the applications 110, 114, respectively. Note that the terms "database" and "data" are used herein to refer to data that conforms to schema or record format, and the term schema refers to a structured description of the data. A schema may include descriptions of one or more tables (e.g., as sub-schemas or a group of schemas). Transaction logs 104, 106 record changes to databases in log files, and can be used to review or replay the changes. Since the transaction logs can be used to construct the contents of the database, the transaction logs can be considered to be databases themselves.

In one or more embodiments, changes to the schemas 130, 132 are reflected in the state of the cloud 102. In one aspect, the cloud is analogous to a container of files stored on the server 108. Each device 120, 122 updates its own set of the transaction logs 10, thereby creating a new set of files that are uploaded to the server. Thus the version 1 log history 104 would be one distinct set of files in the cloud, and the version 2 log history 106 would be another distinct set of files, copied from the version 1 files. Thus the files can have the same names and metadata.

In one or more embodiments, each database 103, 105 has an associated schema 130, 132 that describes the structure of data stored in the database. For example, a schema 130 can include elements that define individual data items that can be present in data that conforms to the schema. Schema elements can be, for example, data fields, each having a name and an associated type. A database instance that conforms to the schema has values for the schema elements, or at least for the required schema elements, if some of the elements are optional. The data stored in the database is dependent upon the schema, so if the schema is changed, even by the addition or removal of one field, database files generated with the older version of the schema cannot be used directly (e.g., unmodified) with the newer version of the schema in many cases. The applications 110, 114 can be different versions of the same application, or different applications.

Different application versions 110, 114 can use different versions 130, 132 of the same original schema to store their associated data. The different schema versions can have different fields or elements, e.g., a schema element such as a person's email address may be present in only one of the schemas, in which case the schemas may be incompatible. One of the schemas 130 may have more or fewer elements than the other schema 132, or use a different data type for an element, and so on. Therefore, a separate database 103, 105 is created for each separate schema version 130, 132. In this way, the databases are segregated. In one example, each database is identified by a hash code generated based upon the database's schema.

As introduced above, in one or more embodiments, each version of the application 120, 122 creates its own database instance 103, 105 and its own independent set, i.e., container, of database transaction logs 10 4, 106 on a server 108 in the cloud 102. As changes are made to the database(s) 103, 105, the changes are recorded in the transaction log(s) 104, 106 associated with the database(s). Within each transaction log 104, 106, there is a set of dictionaries, with one dictionary for inserted objects, one dictionary for updated objects, and one dictionary for deleted objects. These dictionaries are collections or key-value containers and can be stored as fields in the transaction log with names such as inserted, updated, and deleted. For example, a transaction log that represents version 1 of the schema can include entries firstName="John", lastName="Doe" in the inserted field 206.

In one or more embodiments, when an application 110 is updated to a newer version 132, the database schema 130 used by that application is also updated to the newer version 132. When a schema 130 is updated to an incompatible schema, as can be the case when applications are upgraded, existing databases such as the database v1 103 become incompatible with new database versions 132 used by the updated application. The data stored in the older database 103 is still useful, however, and may not be present in the new database 105, depending on the times at which the new database 105 was created and the older database 104 was updated. Therefore, an upgrade process is provided for updating a database 103 from an older schema version 130 to a newer schema version 132, as described below with respect to FIG. 5.

FIG. 2 is a representative drawing showing upgrading of a cloud-based database used by an application from an existing version to a new version with incorporation of data from the existing version into the new version in accordance with one or more embodiments. FIG. 2 shows operations that occur when an application 110 is upgraded from a first version (e.g., v1) to a second version (e.g., v2). The first and second versions may be any consecutive versions, and are not limited to versions 1 and 2. The first version of the application uses a first schema version 130 (e.g., version 1 of a Person schema), but the second version of the application uses second schema version 132 (e.g., version 2 of the Person schema), which differs from the first version by at least one element. Database upgrade logic 142 performs the upgrade. To perform the upgrade, the local data store 112 on the device of the application 110 to be upgraded is upgraded to the second schema version 130, e.g., using a schema migration process to migrate the version 1 data in the data store 112 to version 2 data that conforms to the second schema as described elsewhere herein. The first schema version's transaction logs 204 are duplicated, and the duplicate log copy 208 is stored in a log container 122 of the database 105 in which the second schema version 132 is located. The duplicate log copy 208 is rewritten using the second schema 132 by applying the changes specified in the new database's log file 206 to the duplicate log copy 208. Upon completion of this upgrade process, the first device references the second database version 105, and no longer references the first database version 103. The first database version 103 is retained until it is no longer referenced by any devices.

FIG. 3 is a representative drawing showing upgrading of a cloud-based database from an existing version to a new version with incorporation of data from the existing version into the new version in accordance with one or more embodiments. To perform the upgrade of application FIG. 3 shows operations that occur when an application 114 is upgraded from a first version to a second version, and the upgrade involves upgrading a database used by the application 114 from a first version 103 to a second version 105. In FIG. 3, another application 310 on another device 120 has previously upgraded from the first version 103 to the second version 105. Thus, any changes that have been made to the first version of the database 103 by the application 114 on the second device 122 have not been applied to the second version of the database 105. These changes to the first version of the database 103 are incorporated into the second database version 105 by the database upgrade logic 202 when the second device is upgraded to the second version of the database 105. The upgrade process is similar that described above with respect to FIG. 2. To perform the upgrade, the local data store 116 on the device 122 of the application 114 being upgraded is upgraded to the second schema version 130, e.g., using a schema migration process. The first schema's transaction logs 304, which may have been updated since the previous upgrade shown in FIG. 2, are duplicated, and the duplicate log copy 308 is stored in a log container 122 of the database 105 in which the second schema version 132 is located. The duplicate log copy 308 is rewritten using the second schema 132 by applying the changes specified in the new database's log file 306 to the duplicate log copy 308. Upon completion of this upgrade process, the second device references the second version 105, and no other devices reference the first database version 103. Therefore, the first database 103 is deleted and the storage occupied by the first database 103 is made available for other uses.

FIG. 4 is an illustrative drawing of a transaction log in accordance with one or more embodiments. A transaction log 402 includes one or more dictionaries, which are name-value pairs that represent the data changes made by the transaction. The transaction log 402 is a single log entry, and includes an inserted dictionary 404, an updated dictionary 406, and a deleted dictionary 408. Transaction logs such as the logs 104, 106 of FIG. 1 can thus include any number of entries of the form shown in the transaction log 402. Each of the inserted, updated, and deleted dictionaries specifies one or more changes to entries in a database table associated with the dictionary. A table named Person is associated with the dictionaries in the log 402. The inserted dictionary 404 includes entries that represent row of data to be inserted into the table or schema elements that are to be inserted into the schema that defines the table's format. For example, an entry firstName="John" represents the insertion of the value "John" into a firstName column of the Person table. A schema change is shown as an entry with the name Schema and a value "homeAddress" which represents the name of a schema element to be inserted into the schema of the Person table. The format and conventions described here are used as examples, and other formats are possible in other embodiments. The updated dictionary 406 represents updates to rows of the specified table or elements of the specified table's schema. For example, the entry Schema emailAddress="email" indicates that a new schema element named "email" is to be added to the schema of the Person table. The entry lastName="Doe" indicates that the last name of a person is to be changed to "Doe". Details such as selection of particular rows and data types of schema elements are not shown. The deleted dictionary 408 represents deletions of rows from the specified table or elements from the specified table's schema. For example, the entry firstName="Sam" indicates that a row having a firstName column with the value "Sam" is to be deleted from the Person table. In one example, one or more of the inserted, updated, and deleted dictionaries can be omitted from a transaction log entry, e.g., if there is no applicable data in a log entry.

As introduced above, one type of transaction log migration involves a change made to a database schema. For example, a new column can be inserted into the database when a new schema version is created. If a user inserts a column named "emailAddress" in version 2 of the schema, then a corresponding "emailAddress" entry is stored in the inserted column (i.e., field) of the transaction log. Empty values are not necessarily stored in the log. If the column has a default value, e.g., null, then the default value is stored in the log in association with the name, e.g., emailAddress=null. Every change a user makes is applied to the log in this way. For example, if a change is made in version 2, then when updating a version 1 log to version 2, the change is applied to the version 1 log. Thus the emailAddress=null is stored in the version 1 log during log migration.

Changes to a schema can be represented by entries in the transaction log as described above. There can be transaction log entries for schema changes (e.g., changes that can be specified in a Data Definition Language (DDL)) such as creation of a table, addition or removal of columns to or from a table, removal of a table, and the like. In one example, full table migration is provided, in which the name of an entity or object is changed. The name of a table can change, e.g., from Entity to Person. The name of a column can also be changed, e.g., from lastName to last. These changes can be done for each dictionary, e.g., inserted 404, updated 406, or deleted 408. The type of a record can change. For example, if there is a record type named Person with a subtype named Employee, the type of a record can be changed from Person to Employee. Properties can be added and removed, and relationships to other data can be added.

Figure 5:
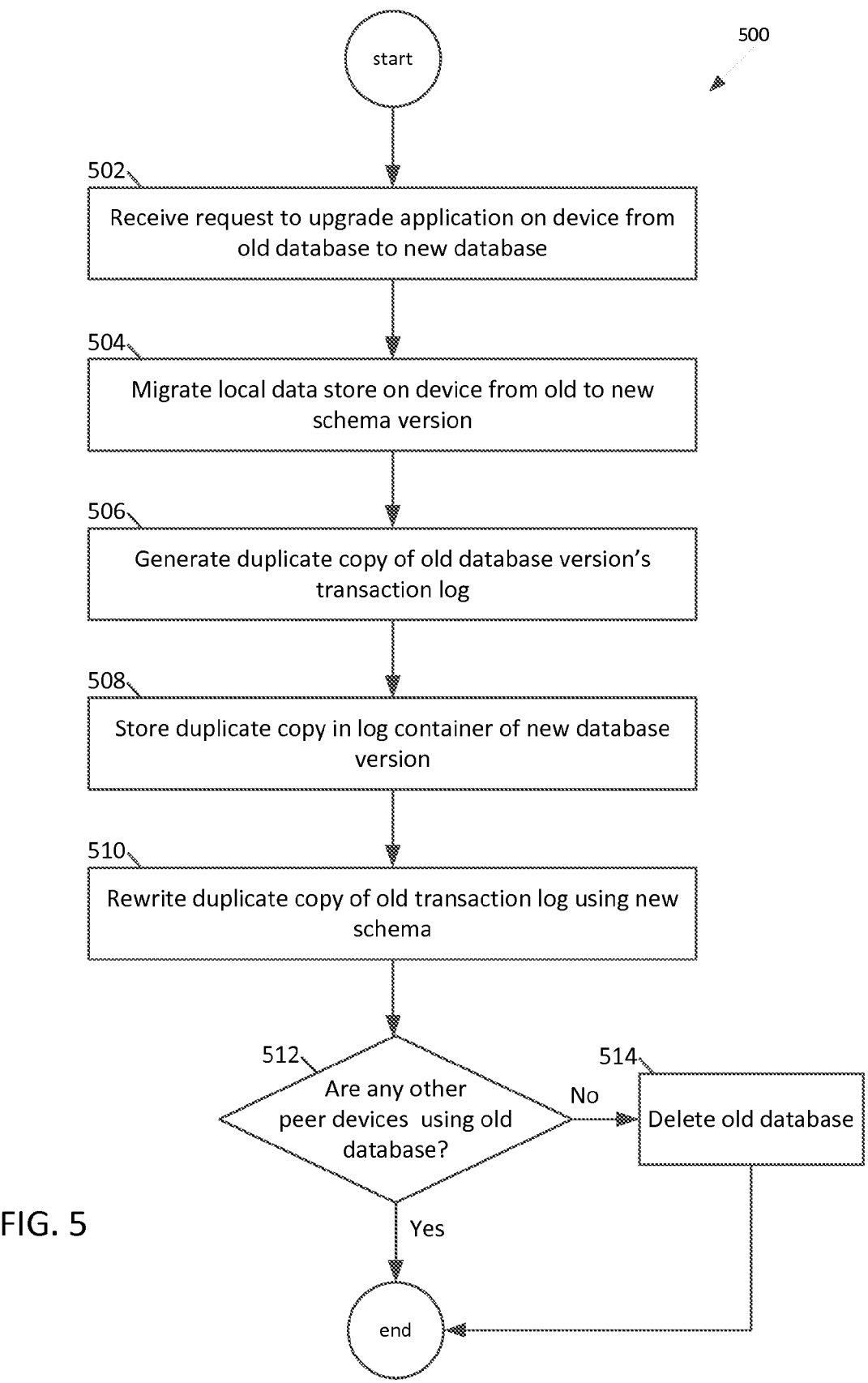
FIG. 5 is a representative flowchart of a database upgrade process in accordance with one or more embodiments.

FIG. 5 is an illustrative drawing showing a process 500 of upgrading a database in accordance with embodiments. Process 300 can represent the database upgrade 142 of FIG. 1 and can be implemented as, for example, computer program code encoded on a computer readable medium and executable by a processor of a computer system. Process 500 can be invoked by a process on the server computer system 108 when an application 110 is upgraded and the upgraded version of the application uses a schema that differs from the schema used by the existing version of the application 110 prior to the upgrade. The update process 300 begins at block 502 by receiving a request to update the first app to the second version. Block 504 migrates the first database file 112 to conform to the second schema version.

Block 506 generates a duplicate copy of old database version's transaction logs 104. Block 508 stores the duplicate copy 208 of the transaction logs in a log container 122 of the new database version 105. Block 510 rewrites the duplicate copy 208 of the first transaction logs using the second schema by applying the changes specified in the new database version's log file 206 to each transaction in the duplicate transaction log 208 in the order that the transactions appear in the new database's log file 206. In one aspect, the log migration process is performed for each file. In another embodiment, an original log file 206 is duplicated, the original is opened, the kind of data and the changes represented by the log file 206 are identified, and the corresponding changes are made to the file 204 of the version being migrated. The file 204 is then moved to the new location 208. The duplicate is retained until it is longer referenced by any peers. The old database version's transaction logs 204 can retained until they are not referenced by any peer devices, so block 512 determines if there are any other peer devices referencing the old database version 130. If not, block 514 deletes the old database 103. If so, the old database 103 is retained for possible use by the other peer devices that reference it.

In one or more embodiments, after updating the database 103 to the newer version (e.g., to version 2), the previous version's logs (e.g., the version 1 logs), or a copy of the logs, is retained. There may be a device that needs the older version of the logs, and may use them for conflict resolution or other tasks. That is, there can be one or more peer devices 122 that have version 1 data, or version 2 data, or both version 1 and version 2 data. In one aspect, peers 122 are devices associated with the same cloud account as the device 120. The peer devices 122 will retain the data from version 1 until they determine that no other peers reference the version 1 data. Once all of the peers 122 have updated to the latest version, they will purge the version 1 data.

Block 512 can determine if there are any other peer devices referencing the old database by, for example, retrieving files from a file system directory structure that represents the known devices of the user that are currently associated or registered with the cloud 102. This directory structure is maintained by cloud service logic 140, e.g., by receiving messages or monitoring connections from user devices and updating the directory structure by adding or deleting entries for the devices as the devices become active or inactive, respectively. A representation of each peer is stored in a directory, e.g. in a directory named /Peer1 for a peer named Peer1. Within each peer directory is a special directory for each schema version, e.g., /Peer1/V1 and Peer1/V2 for schema versions V1 and V2 on Peer1. If block 512 determines that there is an entry in the directory structure for a peer device and a particular version of a schema, then that version of the schema is in use and is retained, since it may be needed, e.g., to recover data. For example, if a peer directory that has a V1 but not a V2 is found, then the V1 logs are retained, because that peer might need the logs to perform conflict resolution or to be used in some other transaction. Once all the known peers 122 have the V2 directory, the V1 directories can be purged. If a search of the directory structure at block 512 indicates that there are no devices referencing a version of the schema, then that version of the schema is deleted at block 514.

In one or more embodiments, multiple cloud user accounts can be used with the techniques described herein by sharing the same transaction log directory among the user accounts, e.g., using a network file system or other sharing mechanism.

The upgrade techniques described herein can use a mapping to transfer information from the older version to the new format of the new version. Transaction logs 104 of the older version (v1) are then modified to the new format (v2), then replayed along with the timeline of changes to merge the historical information and bring devices into sync and preserve the changes. This merging of transaction logs does not merely merge the end result; instead, the activities that were recorded in the transaction logs are merged.

As an example of schema migration, suppose that the first release of an application program for a computer system and/or mobile device uses a particular schema, which is referred to as Item schema version 1. Data created and used by version 1 of the application conforms to this schema, and is a set of records such as ("Camera", 99.99) and ("Memory Card", 4.99). Subsequently, the application is upgraded to version 2, and the amount of tax on each item is added to the schema. Application version 2 uses Item schema version 2, which has three fields: name, price, and tax (e.g., name, price, tax). The data created with Item schema version 1 is not directly compatible with Item schema version 2, because there is a new field (tax) in version 2 that is not in version 1, and there are no tax values in the version 1 data. If the application requires the tax values, then the application does not work properly with the version 1 data. In this scenario, with a single change to the schema, a migration process can be used to upgrade the data from version 1 to version 2 for, for example, retrieving the version 1 data and storing the version 1 data in a version 2 schema with a default tax value, such as a value calculated as a percentage of the item price. This migration process can be performed by a migration program that is dedicated to use in schema migration, or by version 2 of the application. The result of the migration process is a new set of data records that conform to the Item schema version 2, e.g., ("Camera", 99.99, 8.00) and ("Memory Card", 4.99, 0.40).

Embodiments of the invention enable different applications and application versions to use different schemas to store application data, with the schemas changing over time as new versions of the application are released. Applications can be upgraded, and a schema can change when an application is upgraded.

Figure 6:
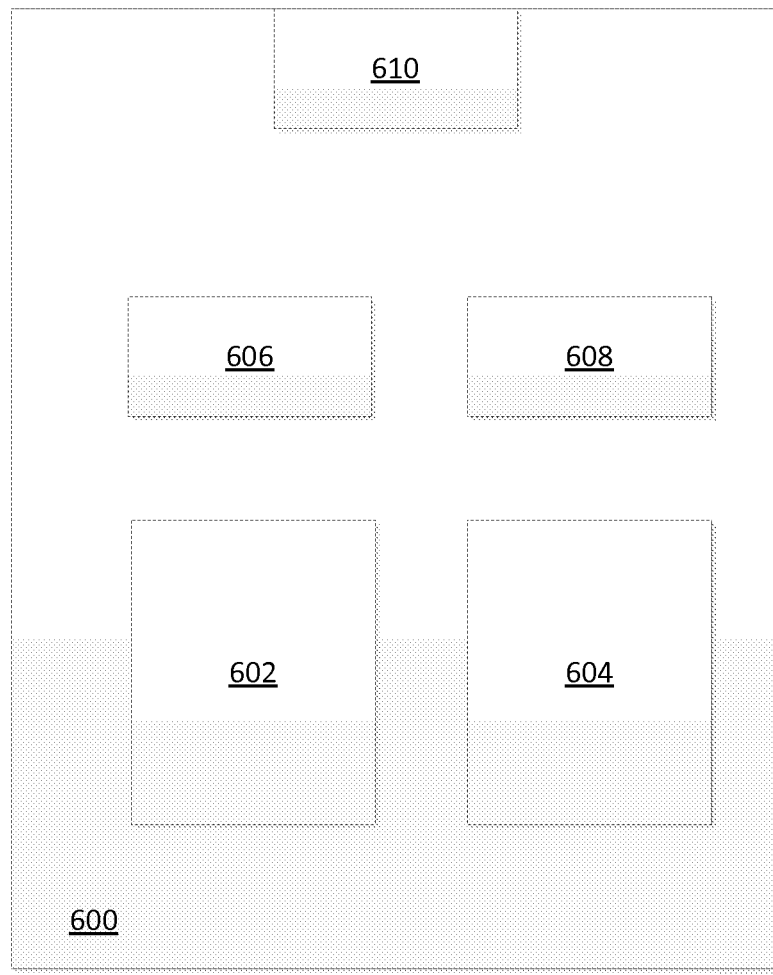
FIG. 6 shows a system block diagram of computer system used to execute the software of an embodiment.

FIG. 6 shows a system block diagram of computer system 600 used to execute the software of an embodiment. Computer system 600 includes subsystems such as a central processor 602, system memory 604, fixed storage 606 (e.g., hard drive), removable storage 608 (e.g., FLASH), and network interface 610. The central processor 602, for example, can execute computer program code (e.g., an operating system) to implement the invention. An operating system is normally, but necessarily) resident in the system memory 604 during its execution. Other computer systems suitable for use with the invention may include additional or fewer subsystems. For example, another computer system could include more than one processor 602 (i.e., a multi-processor system) or a cache memory.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A machine-readable non-transitory storage medium configured to store instructions that, when executed by a processor included in a computing device, cause the computing device to perform steps that include:
   maintaining a first database that corresponds to a first schema and includes a first transaction log, wherein a first version of an application on a first device is synchronized with the first database;
   maintaining a second database that corresponds to a second schema and includes a second transaction log, wherein the second transaction log is associated with a second version of the application on a second device;
   receiving a request to upgrade the first version of the application to the second version of the application;
   generating a duplicate log in the second database, wherein the duplicate log is based on one or more entries of the first transaction log; and
   synchronizing the duplicate log with the second database, wherein synchronizing comprises:
      modifying at least one entry included in the duplicate log based on (i) the second schema, and (ii) an entry included in the second transaction log.

2. The machine-readable non-transitory storage medium of claim 1, wherein the steps further include:
   deleting the first database responsive to determining that the first device no longer references the first database.

3. The machine-readable non-transitory storage medium of claim 1, wherein the steps further include:
   causing the first device to reference the second database; and
   maintaining the first database after the first device references the second database.

4. The machine-readable non-transitory storage medium of claim 1, wherein the first schema differs from the second schema by at least one field name or field type.

5. The machine-readable non-transitory storage medium of claim 1, wherein the steps further include:
   causing the first device to reference the second database after completion of the synchronization.

6. The machine-readable non-transitory storage medium of claim 1, wherein the second transaction log includes a collection of fields that identify updated entries.

7. The machine-readable non-transitory storage medium of claim 1, wherein the first database and the second database are managed by a single cloud server.

8. The machine-readable non-transitory storage medium of claim 1, wherein the second transaction log includes a set of updated entries and inserted entries.

9. The machine-readable non-transitory storage medium of claim 8, wherein synchronizing the duplicate log with the second database further comprises:
   merging entries that are present in both the duplicate log and the second database to form merged items; and
   storing the merged items in the second database.

10. A system configured to upgrade a database schema of an application, the system comprising:
    a processor; and
    a memory configured to store instructions that, when executed by the processor, cause the system to perform steps that include:
    maintaining a first database that corresponds to a first schema and includes a first transaction log, wherein a first version of the application on a first device is synchronized with the first database;
    maintaining a second database that corresponds to a second schema and includes a second transaction log, wherein a second version of the application on a second device is synchronized with the second database;
    receiving a request to upgrade the first version of the application to the second version of the application;
    generating a duplicate log in the second database, wherein the duplicate log is based on one or more entries of the first transaction log; and
    synchronizing the duplicate log with the second database, wherein synchronizing comprises:
       modifying at least one entry included in the duplicate log based on (i) the second schema, and (ii) an entry included in the second transaction log.

11. The system of claim 10, wherein the steps further include:
    deleting the first database responsive to determining that the first device no longer references the first database.

12. The system of claim 10, wherein the steps further include:
    causing the first device to reference the second database after completion of the synchronization.

13. The system of claim 10, wherein each of the first database and the second database is managed by a single cloud server.

14. The system of claim 10, wherein the second transaction log includes a set of updated entries and inserted entries.

15. A method for upgrading a database schema of an application, the method comprising:
    maintaining a first database that corresponds to a first schema and includes a first transaction log, wherein a first version of the application on a first device is synchronized with the first database;

maintaining a second database that corresponds to a second schema and includes a second transaction log, wherein a second version of the application on a second device is synchronized with the second database;

receiving a request to upgrade the first version of the application to the second;

version of the application;

generating a duplicate log in the second database, wherein the duplicate log is based on one or more entries of the first transaction log; and synchronizing the duplicate log with the second database, wherein synchronizing comprising:
    modifying at least one entry included in the duplicate log based on (i) the second schema, and (ii) an entry included in the second transaction log.

16. The method of claim 15, further comprising:

deleting the first database responsive to determining that the first device no longer references the first database.

17. The method of claim 15, further comprising:

causing the first device to reference the second database; and maintaining the first database after the first device references the second database.

18. The method of claim 15, wherein the first schema differs from the second schema by at least one field name or field type.

19. The method of claim 15, further comprising:

causing the first device to reference the second database after completion of the synchronization.

20. The method of claim 19, wherein each of the first database and the second database is managed by a single cloud server.

* * * * *